United States Patent [19]

Garnjost

[11] Patent Number: 5,067,684

[45] Date of Patent: Nov. 26, 1991

[54] VIBRATION-ISOLATING MACHINE MOUNT

[75] Inventor: Kenneth D. Garnjost, Buffalo, N.Y.

[73] Assignee: Moog Inc., East Aurora, N.Y.

[21] Appl. No.: 555,530

[22] PCT Filed: Dec. 22, 1988

[86] PCT No.: PCT/US88/04628

§ 371 Date: Feb. 16, 1990

§ 102(e) Date: Feb. 16, 1990

[51] Int. Cl.$^5$ ............................................. F16M 13/00
[52] U.S. Cl. .................................... 248/550; 248/636;
248/638; 267/140.1
[58] Field of Search ............... 248/550, 636, 638, 566,
248/563; 180/300; 267/140.1; 188/378

[56] References Cited

U.S. PATENT DOCUMENTS

| | | | |
|---|---|---|---|
| 3,701,499 | 10/1972 | Schubert | 248/550 X |
| 3,917,246 | 11/1975 | Gartner | 188/378 X |
| 4,546,960 | 10/1985 | Abrams | 267/140.1 X |
| 4,648,576 | 3/1987 | Matsui | 248/636 X |
| 4,700,933 | 10/1987 | Chikamori | 267/140.1 |
| 4,709,779 | 12/1987 | Takehara | 180/300 |
| 4,793,599 | 12/1988 | Ishioka | 267/140.1 |
| 4,802,648 | 2/1989 | Decker | 248/638 |
| 4,828,234 | 5/1989 | Hoying | 248/550 X |
| 4,887,699 | 12/1989 | Ivers | 188/378 |

Primary Examiner—J. Franklin Foss
Attorney, Agent, or Firm—Sommer, Oliverio & Sommer

[57] ABSTRACT

A vibration isolator is operatively associated with a suspension having a spring (21) and a fluid damper (22) arranged in parallel with one another between two masses (23, 24) which are arranged to move relatively toward and away from one another. A restricted orifice (33) communicates the opposed damper chambers (30, 31). The vibration isolator includes a fluid pump (46) and an actuator (48) for operating the pump. The pump has a first chamber (51) communicating with the damper first chamber (30), and has a second chamber (52) communicating with the damper second chamber (31). The pump is selectively operated so as to create a pressure differential across the orifice to oppose and substantially cancel the dynamic force transmitted through the spring and damper and attributable to high-frequency relative vibration between the masses, while permitting the damper to damp low-frequency relative velocity between the masses.

16 Claims, 4 Drawing Sheets

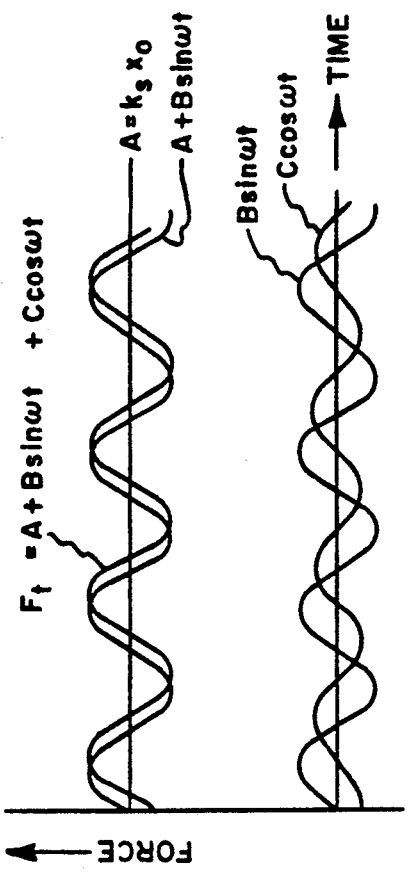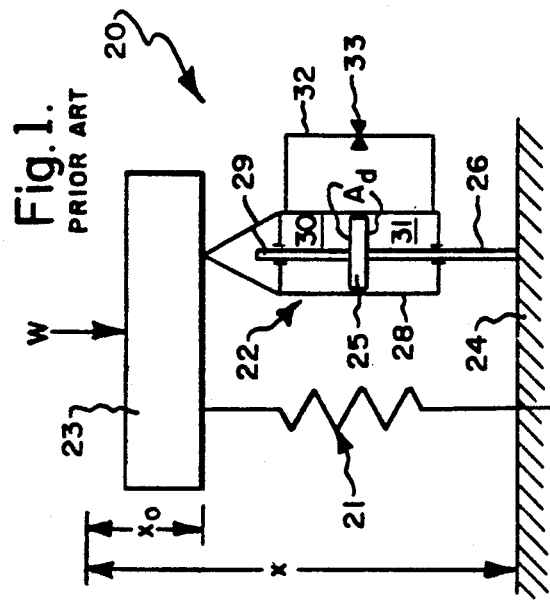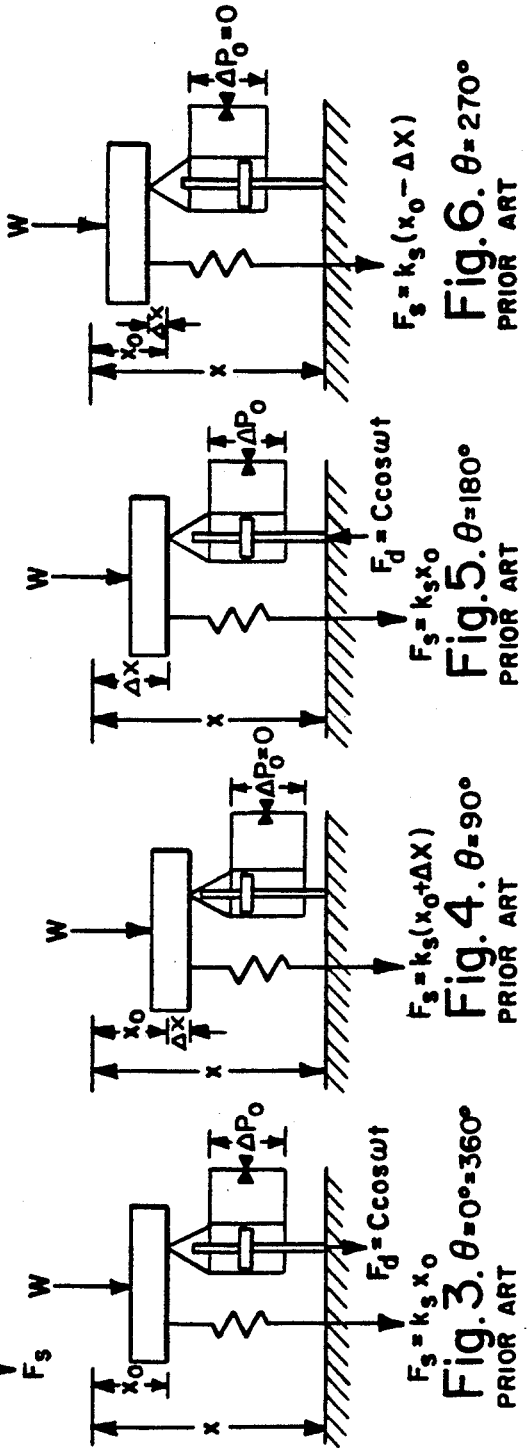

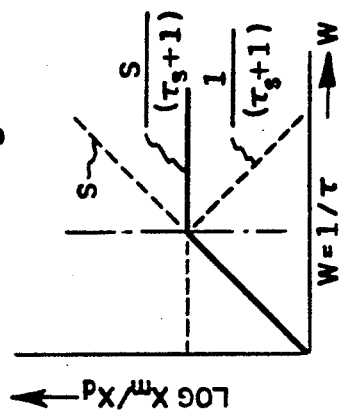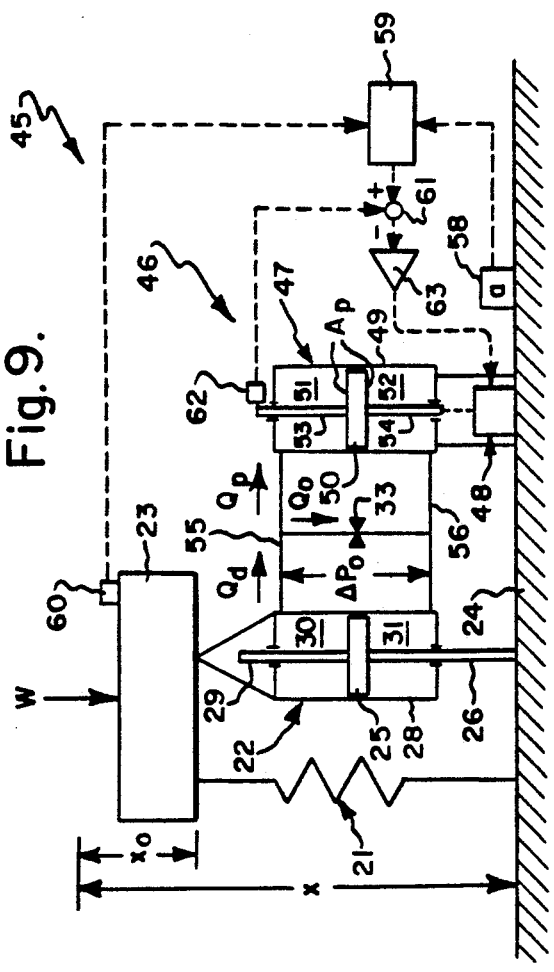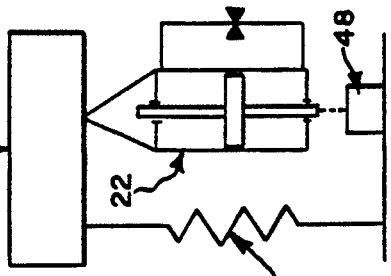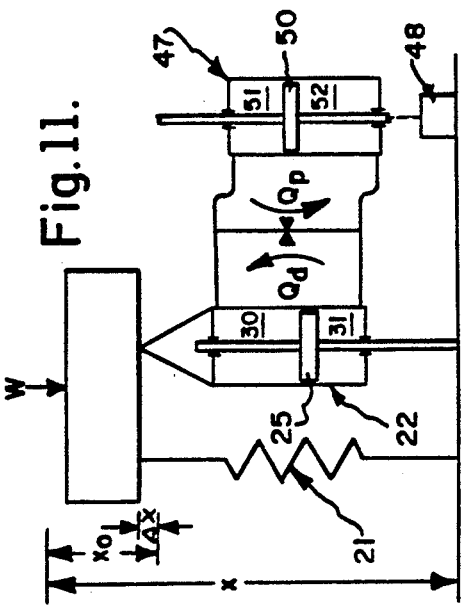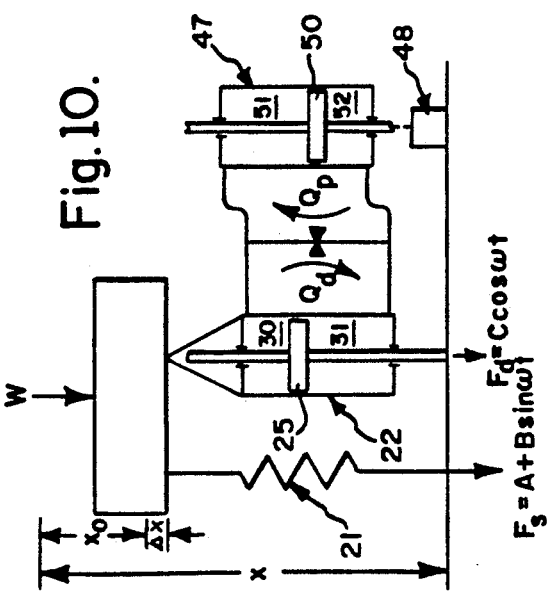

VIBRATION-ISOLATING MACHINE MOUNT

TECHNICAL FIELD

The present invention relates generally to the field of machine and motor mounts, and, more particularly, to an improved actively-controlled machine mount which permits static and quasi-static forces to be transmitted from the machine to a support through a spring and damper arranged in parallel with one another, while effectively decoupling the machine from the support to transmission of high-frequency vibrational forces above a "break" frequency.

BACKGROUND ART

Many machines, such as engines, motors, compressors and the like, are connected to suitable supports via intermediate mounts. Such mounts are intended to isolate vibrations, but must also be capable of supporting the weight of the machine and damping low-frequency large-amplitude motions of the machine relative to the support (e.g., due to variations in engine speed, load torque reaction, etc.). The design of such mounts is largely dependent upon the nature and types of forces transmitted between the machine and the support. In some applications, such as a gas-powered automobile engine, the mount may simply be an elastomeric block.

In other cases, such as a diesel engine, the mount may take the form of a spring and a damper arranged in parallel with one another to act between the engine and the support. In these latter configurations, the spring is typically made as soft as practicable to support the weight of the engine, but to allow relatively-free vibratory motion of the engine without transmitting large forces through the spring to the supporting structure. The damper is needed to constrain low-frequency large-amplitude transient motions, but inadvertently acts as an unwanted force transmitter at higher frequencies. The reason for this is that the conventional damper typically comprises a piston-and-cylinder arrangement having opposed chambers communicating with one another through a restricted orifice. If there is relative velocity between the engine and support, a pressure differential will be developed across the orifice. This pressure differential acts across the face of the damper piston, and therefore can transmit forces between the engine and the support.

It has been proposed to add "active" elements to such machine mounts. Theoretically, such elements can be selectively controlled so as to effectively cancel the net dynamic force transmitted through the spring and damper due to vibratory motion of the engine. Upon information and belief, it has been heretofore proposed to install an electromagnetic force motor, or "shaker", in parallel with the spring and damper of each mount. An accelerometer mounted on the support in the vicinity of the mount supplies a signal to a controller, which operates the "shaker" to produce an output force waveform on the masses which is of like magnitude but 180° out-of-phase with respect to the sum of the vibrational forces transmitted through the spring and damper, such that the net force transmitted through the suspension is substantially reduced to zero.

The "shaker" must have the capability of overcoming the spring stiffness and damper reaction force at the vibration amplitude determined by the various vibratory forces acting on the engine inertia as a free body in space. The cancelling force which the "shaker" must produce can be reduced by reducing the spring stiffness, but this has the offsetting effect of allowing greater low-frequency spring deflection, for example, during engine torque reaction. The "shaker" motor must therefore be designed to produce the maximum required force anywhere within the spring deflection range. Such "shaker" motors are typically constructed as a conductor (i.e., a so-called "voice coil") moving in a magnetic field. These devices are thus necessarily large, heavy and expensive.

Accordingly, it would be generally desirable to provide an improved machine which avoids the size, weight and cost problems associated with such prior art "shakers", and which is electrically more efficient, while effectively cancelling the transmission of vibrational forces from the machine to the mount.

DISCLOSURE OF THE INVENTION

The present invention provides an improvement for use in a suspension having one mass (e.g., a machine) arranged to move relatively toward and away from another mass (e.g., a support), and having a spring and damper arranged in parallel with one another to act between the masses. The damper has a first and second fluid-containing chambers continuously communicating with one another through a restricted orifice. The improvement broadly includes fluid displacement generating means operatively arranged to selectively create a net pressure differential across the orifice to reduce the dynamic force attributable to such relative motion between the masses and transmitted through the spring and damper. In the preferred embodiment, the fluid displacement generating means is arranged to substantially cancel the dynamic force transmitted through both of the spring and damper and attributable to such relative motion between the masses.

The fluid displacement generating means broadly includes a fluid pump (e.g., a piston-and-cylinder arrangement) having opposed first and second chambers. The pump first chamber continuously communicates with the damper first chamber, and the pump second chamber continuously communicates with the damper second chamber. The damper and pump chambers are therefore arranged hydraulically in parallel with the orifice. Each of the chambers, and any and all passageways therebetween, are completely filled with a suitable fluid, preferably an incompressible liquid. An actuator (e.g., a short-stroke variable air gap electromagnetic motor) is operatively arranged to controllably vary the volumes of the pump chambers to create such net pressure differential across the orifice.

In the preferred embodiment, the damper is operatively arranged to damp low-frequency relative velocity between the masses, and the fluid displacement generating means is arranged to oppose and substantially cancel the transmission of high-frequency vibratory forces between the masses. The high- and low-frequency ranges are separated by a predetermined "break" frequency, which is related to a time constant of the suspension. In effect, the pump is hydraulically coupled to the damper at frequencies above the "break" frequency, but effectively decoupled from the damper at frequencies below such "break" frequency. The fluid displacement generating means is preferably arranged to exert a force waveform on the masses which is similar to, but substantially 180° out-of-phase with respect to, the net high-frequency vibratory force transmitted through the spring and damper.

Therefore, such apparatus, when put to use, performs the method of operating a suspension which is operatively interposed between first and second masses. The masses are mounted to move relatively toward and away from one another at a frequency below the predetermined "break" frequency, and are arranged to vibrate substantially sinusoidally relatively toward and away from one another at a frequency above the "break" frequency. The suspension has a spring and fluid damper arranged in parallel with one another to act between the masses. The damper has opposing chambers continuously communicating with one another through a restricted orifice. The improved method broadly comprises the step of: selectively creating a desired pressure drop across the orifice of such polarity, magnitude and phase to oppose and reduce certain forces transmitted through the spring and damper. In the preferred embodiment, such desired pressure drop is arranged to substantially cancel vibrational forces above the "break" frequency, whereby the dynamic forces transmitted through the suspension and attributable to such high-frequency vibration will be at least reduced and preferably eliminated.

Accordingly, the general object of this invention is to provide an improved suspension for preventing high-frequency forces attributable to relative vibration between the masses from being transmitted through the suspension.

Another object is to provide an improved suspension which will allow for variations in the static and quasistatic loading, but which will effectively prevent the transmission of high-frequency forces, attributable to vibration of one mass relative to the other, from being transmitted through the suspension.

These and other objects and advantages will become apparent from the foregoing and ongoing written specification, the drawings, and the appended claims.

BRIEF DESCRIPTION OF THE DRAWINGS

FIG. 1 is a schematic of one form of a prior art motor mount having a spring and damper arranged in parallel with one another to act between the engine and the support, this view showing the spring as being initially compressed by a preload displacement $x_o$, and showing the static weight of the engine as being transmitted through the spring to the support.

FIG. 2 is a graph of force (ordinate) vs. time (abscissa), showing the spring and damper forces, and the sum of same.

FIG. 3 is a schematic of the structure shown in FIG. 1 at $\theta = \omega t = 0° = 360°$.

FIG. 4 is a schematic of the structure shown in FIG. 1 at $\theta = \omega t = 90°$.

FIG. 5 is a schematic of the structure shown in FIG. 1 at $\theta = \omega t = 180°$.

FIG. 6 is a schematic of the structure shown in FIG. 1 at $\theta = \omega t = 270°$.

FIG. 9 is a schematic of a first form of the improved machine mount, showing the fluid displacement generating means as being connected in parallel with the damper and orifice, and showing the actuator and the control system.

FIG. 10 is a further-simplified schematic of the improved mount, showing the engine as having moved downwardly from the preload position by an incremental distance $\Delta x$.

FIG. 11 is a further-simplified schematic of the improved mount, again similar to FIG. 9, but showing the engine as having moved upwardly from the preload position by an incremental distance $\Delta x$.

FIG. 12 is a graph of log $x_p/x_d$ (ordinate) vs. log $\omega$ (abscissa), showing the "break" frequency defined at the intersection of the s and $1/(\tau+1)$ curves.

FIG. 14 is a schematic of another form of the improved mount, this embodiment having a short-stroke force motor connected mechanically in series with the damper.

MODE(S) OF CARRYING OUT THE INVENTION

Figure 7:
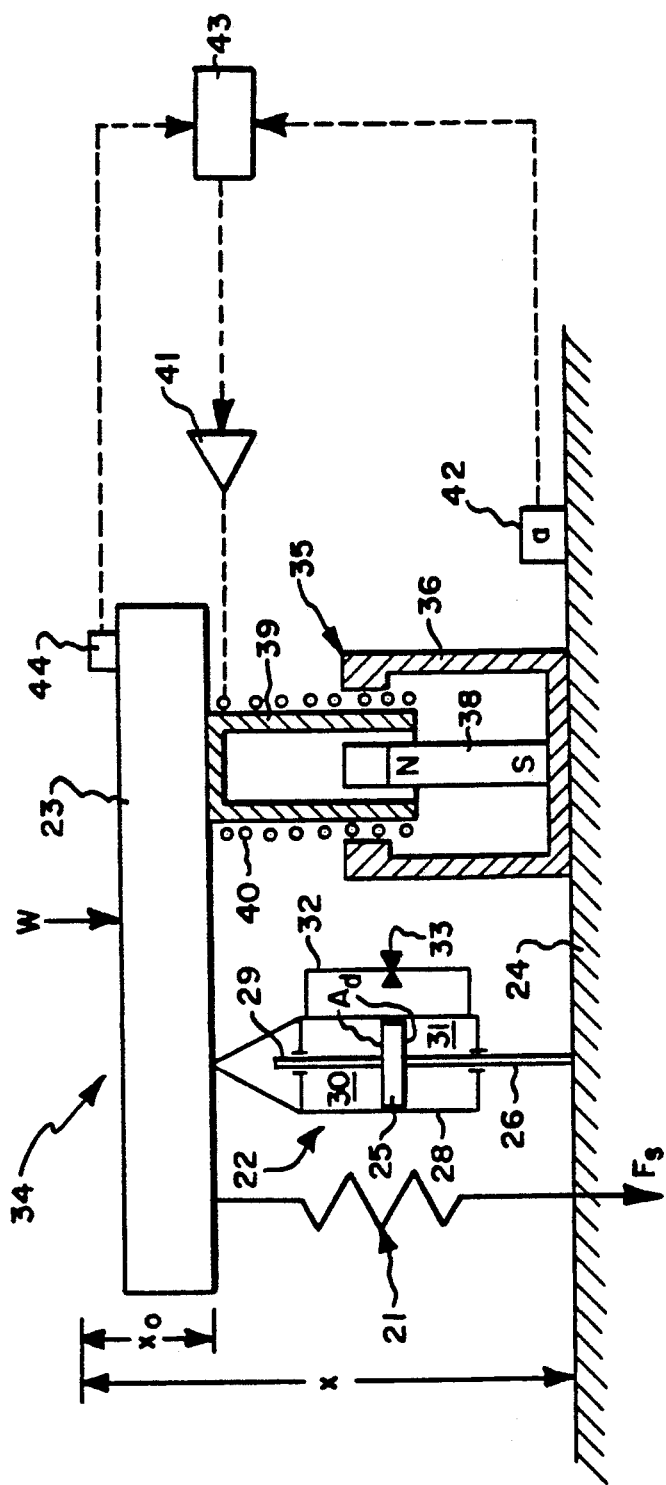
FIG. 7 is a schematic of another form of prior art mount having an electromagnetic "shaker" arranged in parallel with the spring and damper, this view showing the free length of the spring as having been deflected by an initial preload displacement $x_o$ and transmitting the static weight of the engine to the support.

At the outset, it should be clearly understood that like reference numerals are intended to identify the same parts, portions or surfaces consistently throughout the several drawing figures, as such parts, portions or surfaces may be further described or explained by the entire written specification, of which this detailed description is an integral part. Unless otherwise indicated, the drawings are intended to be read together with the specification and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" refer to the orientation of a surface relative to its axis of elongation or axis of rotation, as appropriate.

Referring now to the drawings, the invention will be described with reference to a motor mount operatively interposed between an engine (e.g., a diesel engine) and suitable support (e.g., the frame of a vehicle). However, it should be clearly understood that such environment is merely for purposes of illustration. In other words, the invention is not limited to this particular end use, and may be operatively employed between other types of vibratory machines (e.g., motors, engines, compressors, etc.) and their respective supports.

Figure 8:
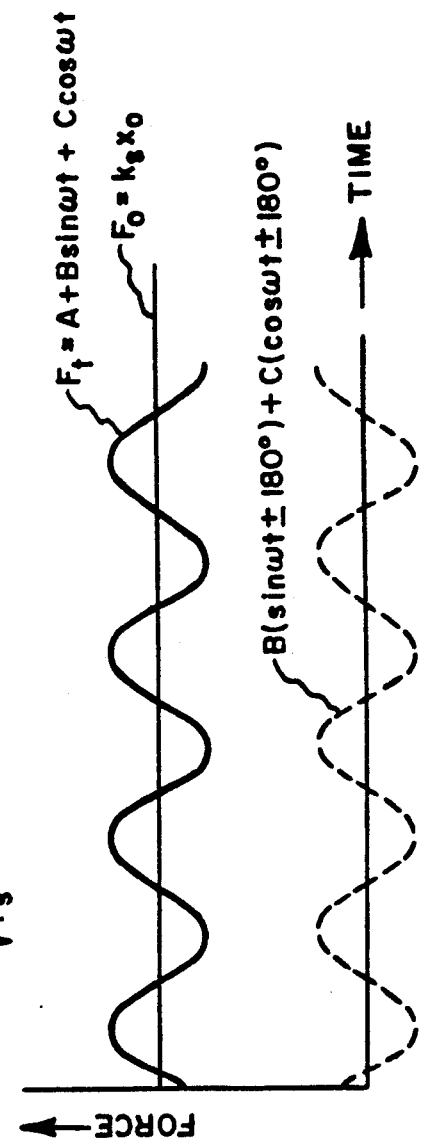
FIG. 8 is a graph of force (ordinate) vs. time (abscissa) for the prior art structure shown in FIG. 7, showing the "shaker" as producing a force waveform 180° out-of-phase with respect to the sum of the spring and damper force vibrational waveforms, so as to substantially cancel the same.

Before proceeding to a discussion of the improved mount, it is felt desirable to review the structure and operation of two prior art engine mounts in order that the context of the present improvement may be better understood and appreciated. A first prior art motor mount is shown in FIGS. 1-6, and second prior art form is shown in FIGS. 7-8. Several embodiments of the improved mount are illustrated in FIGS. 9-14. These three forms will be described seriatim herebelow.

FIRST PRIOR ART MOUNT (FIGS. 1-6)

A first prior art motor mount is generally indicated at 20 in FIG. 1. This form is shown as having a spring 21 and damper 22 arranged in parallel with one another to act between an engine 23 and a suitable support 24. The damper is shown as being a piston-and-cylinder arangement having its piston 25 mounted fast to the support via an intermediate rod 26, and having its cylinder 28 mounted for movement with the engine. Another rod 29 extends upwardly from the piston and sealingly penetrates the upper end wall of the cylinder. Rods 26,29 are of equal diameter. Hence, the upper and lower faces of the damper piston have the same annular area $A_d$. The piston sealingly divides the cylinder into upper and lower chambers 30,31, the volumes of which vary in an inverse manner with relative displacement between the piston and cylinder. These chambers communicate with one another via a passageway 32 containing a restricted orifice 33.

FIG. 1 depicts the situation when the engine is turned "off" (i.e., is not operating), and is simply held in an equilibrium position relative to the support. The pressures in damper chambers 30,31 have equalized, and there is no pressure drop across the orifice (i.e., $\Delta P_o = 0$). The general equation for the force $F_d$ transmitted through the damper from the engine to the support is $F_d = \Delta P_o A_d$, where $\Delta P_o$ is the pressure differential across the damper piston and orifice, and $A_d$ is the cross-sectional area of the damper piston. However, because $\Delta P_o = 0$ in equilibrium, it necessarily follows that $F_d = 0$, and the static weight (W) of the engine is borne solely by the spring. The initial free length (x) of the spring is shown as having been compressively deflected through a preload displacement $x_o$ in order to support the static weight of the engine. In other words, in equilibrium, the spring exerts an upward force on the engine equal to the engine's weight (i.e., $F = W = k_s x_o$, where $k_s$ is the spring rate). At the same time, however, the compressed spring exerts a downward reaction force $F_s$ on the support of like magnitude. Thus, $$F_s = k_s x_o = W \quad (1)$$

Hence, when the engine is not operating, the static weight of the engine compressively deflects the spring through a distance $x_o$ such that the spring will exert an opposing force on the engine and a like reaction force on the support.

Suppose now that the engine is turned "on", and that the various eccentricities and imbalances of its relatively-moving parts cause it to vibrate sinusoidally about its initial preload displacement $x_o$. The general equation for such a sinusoidal waveform as a function of time is:

$$x_t = x_t \sin \omega t \quad (2)$$

where $x_t$ is the position of the waveform relative to its argument at time t, $x_l$ is the maximum amplitude of the vibrational displacement from the argument, $\omega$ is the angular frequency, and t is time. This positional waveform will be superimposed on the initial preload displacement of the spring. In other words, the compressive deflection of the spring ($x_s$) will now vary as a function of time according to the equation:

$$x_s = x_o + x_l \sin \omega t \quad (2)$$

where $x_o$ is the constant preload deflection attributable to the static weight of the engine and $x_l \sin \omega t$ is the amount of dynamic deflection attributable to the vibration of the engine.

The general equation for the force ($F_s$) transmitted through a spring is:

$$F_s = k_s x_s \quad (4)$$

where $k_s$ is the spring rate and $x_s$ is the compressive deflection. $F_s$ and $x_s$ are in phase with one another, since they are related by a constant. Hence, if $x_s$ varies as a function of time, then $F_s$ must similarly vary as a function of time. Thus, substituting equation (3) into equation (4), the force transmitted through the spring ($F_s$) at time t is:

$$F_s = k_s(x_o + x_l \sin \omega t) \quad (5)$$

Because $k_s$, $x_o$ and $x_l$ are constants, equation (5) can be simplified to:

$$F_s = A + B \sin \omega t \quad (6)$$

where A and B are constants.

On the other hand, the force transmitted through the damper $F_d$ at time t is a function of the relative velocity (v) between the engine and the support, not the relative position therebetween. Because velocity is the time derivative of position (i.e., $v = dx/dt$), if the relative position between the masses is a sine function of time (i.e., $x_s = x_o + x_l \sin \omega t$), the damper force will be a cosine function of time (i.e., $F_d = C \cos \omega t$, where C is a constant). Hence, the spring and damper forces will be out-of-phase with respect to one another, with the damper force lagging the spring force by 90°. The total force ($F_t$) transmitted through the spring and damper at any time t must be the sum of the spring and damper forces:

$$F_t = F_s + F_d \quad (7)$$

Or, $$F_t = A + B \sin \omega t + C \cos \omega t \quad (8)$$

This relationship is depicted in FIG. 2, in which force (F) is plotted against time (t). FIG. 2 illustrates the principle of operation, with the frequencies and amplitudes of the various curves having been arbitrarily selected for purposes of illustration. The preload force attributable to the initial compressive deflection of the spring (i.e., $F_s = k_s x_o = A$), is shown as being a horizontal line which does not vary with time. The incremental spring force, attributable to the sinusoidal vibration of the engine (i.e., B sin $\omega t$), is superimposed thereon, and the total spring force $F_s$ is shown as being the sum of these two forces (i.e., A + B sin $\omega t$). On the other hand, the force transmitted through the damper (i.e., $F_d = C \cos \omega t$) is shown as lagging the spring force by 90°. The total force $F_t$ transmitted through the spring and damper at any time t is obtained by adding curves $F_s$ and $F_d$.

FIGS. 3-6 illustrate four discrete positions of the engine relative to the support during one vibrational cycle. FIG. 3 shows the position of the engine at $\theta = \omega t = 0° = 360°$. At that time, the engine is moving downwardly toward the support, but the spring displacement is $x_o$. Thus, the spring force is $F_s = k_s x_o$ [i.e., constant "A" in equations (6) and (8)], but the velocity of the engine causes the damper to exert a downward force (i.e., $F_d = C \cos \omega t$) on the support. Thus, because $\sin 0° = 0$, $B \sin \omega t = 0$, and the total force exerted by the engine is the sum of the preload and damper forces (i.e., $F_t = F_s + F_d = A + C \cos \omega t$). FIG. 4 depicts the situation at $\theta = \omega t = 90°$. Here, because $\cos 90° = 0$, $F_t = F_s + F_d = A + B \sin \omega t + 0 = A + B \sin \omega t$. FIG. 5 illustrates the situation at $\theta = \omega t = 180°$. However, $\sin 180° = 0$ and $\cos 180° = -1$, $F_t = F_s + F_d = A - C \cos \omega t$. Finally, FIG. 6 depicts the situation at $\theta = \omega t = 270°$. However, because $\sin 270° = -1$ and $\cos 270° = 0$, $F_t = F_s + F_d = A - B \sin \omega t$.

Thus, when the engine is turned "on" so that it vibrates about the preload displacement of the spring, the total force transmitted by the spring and damper to the support varies as a function of time. In effect, there are two parallel force-transmitting paths (i.e., through the spring and through the damper) between the engine and the support. The magnitude of the force transmitted through each path varies with time, but the sum of such forces at any point in time is the total force transmitted from the engine to the support at that particular time. Hence, the support "feels" the time-varying relative vibrational movement of the engine.

SECOND PRIOR ART MOUNT (FIGS. 7-8)

In an attempt to remedy the foregoing problem, it is believed that others have proposed to add an electromagnetic force motor, or "shaker", in parallel with the spring and damper, as schematically shown in FIG. 7.

This apparatus, generally indicated at 34, is shown as again including a spring and damper arranged in parallel with one another. Hence, the same reference numerals have again been used in FIG. 7 to identify previously-described structure.

The "shaker", generally indicated at 35, is believed to have included an annular member 36 mounted on the support and in which the upstanding center cylindrical leg 38 was a permanent magnet. An inverted cup-shaped armature 39 was mounted on the engine for movement therewith, and had its depending skirt-like portion operatively arranged between the inwardly- and outwardly-facing polepieces of member 36. The armature was surrounded by a coil 40, which was arranged to be supplied with a suitable current supplied by a driver-amplifier 41. An accelerometer 42 was mounted on the support to sense the vibrational forces transmitted thereto, and was arranged to supply a signal to controller 43. Similarly, a frequency sensor 44 was mounted on the engine, and was adapted to supply an appropriate signal to controller 43 reflecting the vibrational frequency of the engine. Controller 43 was arranged to supply an appropriate signal to driver 41, which, in turn, supplied a current of appropriate phase, amplitude, polarity and frequency to coil 40. This control system is shown in dashed lines only to visually distinguish it from the other structure.

As understood, the intent here was to selectively cause the "shaker" to produce a sinusoidal force on the masses having a waveform [i.e., $B \sin (\omega t \pm 180°) + C \cos (\omega t \pm 180°)$] equal to the time-varying vibrational forces transmitted through the spring and damper [i.e., $B \sin \omega t + C \cos \omega t$], but 180° out-of-phase with respect to such forces, so as to substantially oppose and cancel the vibrational forces, as shown in FIG. 8. In effect, the control system operated to adjust the parameters of the current supplied by driver 41 so that the signal supplied by accelerometer 42 would be driven toward zero. Hence, the support would only "feel" the static weight of the engine, but not the vibrational forces. While this arrangement is feasible, it was heavy and bulky, and electrically inefficient.

THE IMPROVED MOUNT (FIGS. 9-14)

Figure 13:
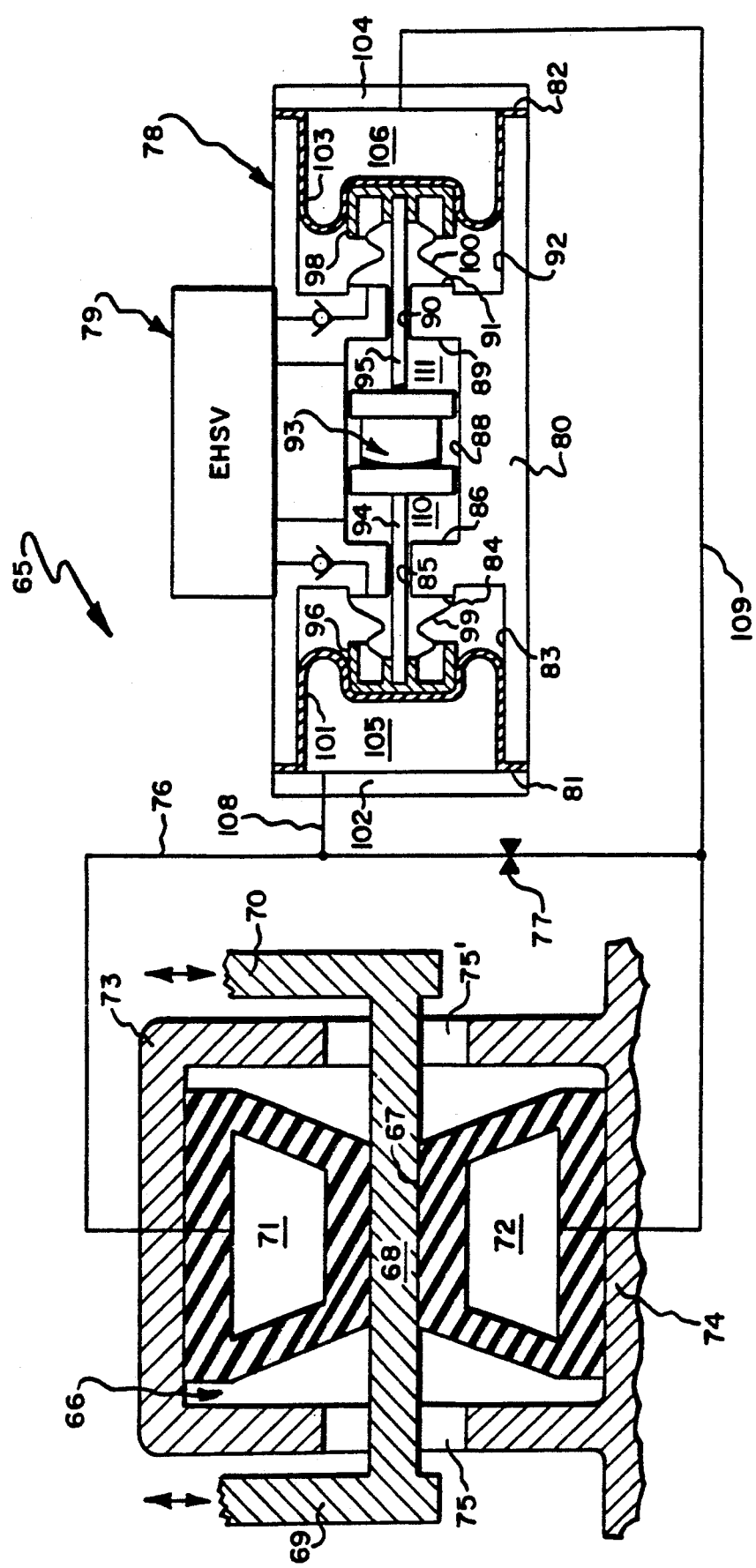
FIG. 13 is a schematic of a commercial form of the improved motor mount.

A first preferred form of the improved machine mount is schematically shown in FIGS. 9-12, a commercial form thereof is shown in FIG. 13, and yet another equivalent form thereof is depicted in FIG. 14.

Referring initially to FIG. 9, the improved mount, generally indicated at 45, is again shown as having a spring 21 and a damper 22 operatively interposed between the engine (or other vibratory machine) 23 and the support. Because these elements have been previously described, a repetitious description thereof will be omitted and the same reference numerals have again been used to indicated like parts, portions or surfaces.

However, improved mount 45 is shown as further including fluid displacement generating means 46 having a positive-displacement pump 47, and an actuator 48 for controllably driving the pump. Pump 47 is shown as being a piston-and-cylinder arrangement having a cylinder 49 mounted on the support. A piston 50 is slidably mounted within this chamber and sealingly subdivides the internal volume of the cylinder into upper and lower chambers 51,52. Rods 53,54 extend upwardly and downwardly from the piston and sealingly penetrate the upper and lower end walls of the cylinder, respectively. These rods have the same diameter, and the upper and lower faces of the piston therefore have the same annular area $A_p$. Passageways 55,56 communicate the upper and lower pump chambers 51,52 with the upper and lower damper chambers 30,31, respectively. Thus, the damper and pump are connected hydraulically in parallel with the orifice. In other words, because chambers 30,51 and 31,52 are in continuous direct fluid communication with one another, respectively, the pressure differential across orifice 33 will also exist across the damper and pump pistons.

Actuator 48 is mounted on the support and is operatively connected to rod 54. Thus, the actuator may be selectively operated so as to move the pump piston upwardly or downwardly, as desired. This pump may, for example, be a short-stroke variable air gap electromagnetic motor, such as shown and described in U.S. Pat. Nos. 4,641,072 or 4,631,430 (the aggregate disclosures of which are hereby incorporated by reference), or an electrohydraulic servoactuator, or some other device or mechanism (i.e., a piezoelectric actuator, etc.) capable of selectively moving the pump piston relative to its cylinder in the desired direction, and at the desired frequency and amplitude.

The control system for the pump-actuator is again shown in dashed lines simply to visually distinguish it from the hydraulic hardware. An accelerometer 58 is mounted on the support to sense the vertical acceleration of the support, and is arranged to supply a suitable input signal to a controller 59. A frequency sensor 60 is mounted on the engine to sense the frequency of its vibration, and is arranged to supply another input signal to controller 59. The controller is arranged to supply a suitable output signal, indicative of the desired position of pump piston 50 relative to its cylinder, as a positive input to a summing point 61. A position transducer 62 is arranged to sense the actual position of the pump piston, and to supply an appropriate signal as a negative input to summing point 61. These two input signals are algebraically summed in summing point 61, which provides an error signal to driver-amplifier 63, which, in turn, supplies a current of desired polarity, magnitude, frequency and phase to actuator 48. This particular control system is merely illustrative, and may be readily changed or modified by persons skilled in this art.

Returning now to the hydraulic portion of the apparatus, all chambers and passageways are entirely filled with a suitable fluid, preferably a relatively-incompressible liquid. Actuator 48 may be suitably operated independently of the position or velocity of the damper piston so as to selectively displace pump piston 50 in such a manner as to create a pressure differential across the orifice, which, when summed with the differential attributable to the vibration, produces a net pressure differential of desired polarity and magnitude across the orifice. For example, in FIG. 3, it was demonstrated that at $\theta = \omega t = 0°$, the engine was moving downwardly toward the support, but was at its initial preload displacement $x_o$. In that position, the spring force transmitted to the support was equal to the weight of the engine (i.e., $F_s = W = k_s x_o = A$). However, because the engine was moving downwardly relative to the support at that time, the damper transmitted a downward force to the support of magnitude $F_d = C \cos \omega t = C \cos \theta$. At $\theta = \omega t = 0°$, that force was at its maximum because $\cos 0° = 1$. Thus, at $\theta = 0°$, $F_d = C$. The reason for such force transmission through the damper was that the relative velocity between the masses produced a pressure drop across the orifice (i.e., $F_d = \Delta P_o A_d$).

In the improved mount, however, pump 47 may be selectively operated so as to create a pressure drop across the orifice to oppose the pressure drop attributable to the relative velocity between the engine and support. Thus, when the engine is moving downwardly toward the support, so that a positive pressure differential would normally exist across the orifice (as in FIG. 3), the pump piston may be moved upwardly so as to simultaneously create a negative pressure differential across the orifice. If the sum of these two pressure differentials is zero, then no vibratory force can be transmitted through the damper at this particular point in time. In effect, the support "feels" the static weight of the engine through the spring, but no vibratory forces through the damper.

As demonstrated in equation (8), the general equation for the force transmitted through the spring and damper is $F_t = A + B \sin \omega t + C \cos \omega t$, where A represents the static preload force transmitted through the spring, B $\sin \omega t$ represents the dynamic vibratory force transmitted through the spring, and C $\cos \omega t$ represents the dynamic vibratory force transmitted through the damper. Because the sine and cosine functions vary inversely, the dynamic forces transmitted through the spring and damper will vary inversely. As illustrated in FIGS. 3-6, at $\theta = 0°$, the dynamic force is transmitted solely through the damper because $\sin 0° = 0$ and $\cos 0° = +1$; at $\theta = 90°$, the dynamic force is transmitted solely through the spring because $\sin 90° = +1$ and $\cos 0° = 0$; at $\theta = 180°$, the dynamic force is again transmitted solely through the damper, but acts upwardly because $\sin 180° = 0$ and $\cos 180° = -1$; and, finally, at $\theta = 270°$, the dynamic force is transmitted through the spring, but acts upwardly because $\sin 270° = -1$ and $\cos 270° = 0$. In essence, the fluid pressure generating means may be operated so as to selectively produce a controllable opposing force waveform on the masses which is 180° out-of-phase with respect to the total vibrationally-generated dynamic force. Thus, if the dynamic or vibratory force is B sin wt + C cos wt, then the force waveform produced by the pump would be B sin (wt ± 108°) + C cos (wt ± 180°) such that the pump-generated force will oppose and substantially cancel the total vibrational force which would normally be transmitted through the spring and damper, with only the static weight of the engine being transmitted through the spring to the support.

The area of the pump piston ($A_p$) need not be the same as the area of the damper piston ($A_d$). The dynamic force transmitted through the damper will be $F_d = \Delta P_o A_d$. But if it be desired that the damper exert a net dynamic force to oppose and cancel the dynamic force transmitted through the spring (i.e., $F_s = k_s \Delta x$), then:

$$F_d = F_s = \Delta P_o A_d = k_s \Delta x \tag{9}$$

where $\Delta x$ is the change in engine position from the preload displacement. Or, $$\Delta P_o = k_s \Delta x / A_d \tag{10}$$

The general equation for flow through an orifice is $Q_o = K(\Delta P_o)^{\frac{1}{2}}$, where K is a constant. Hence, the impedance ($Z_o$) of the orifice is:

$$Z_o = \Delta P_o / Q_o \tag{11}$$

As shown in FIG. 9, the flow from the damper upper chamber ($Q_d$) must be equal to the flow into the pump upper chamber ($Q_p$) plus the flow through the orifice ($Q_o$). Or, $$Q_d = Q_p + Q_o \tag{12}$$

But since flow (Q) is the product of area (A) and velocity (v = dx/dt = sx, where s is the Laplace operator):

$$x_d A_d s = x_p A_p s + \Delta P_o / Z_o \tag{13}$$

Equation (13) may be solved for $x_d$:

$$x_d = (x_p/x)/(k_s/A_p A_d Z_o)(s A_d^2 Z_o k_s + 1) \tag{14}$$

But if a time constant ($\tau$) is defined as:

$$\tau = A_p^2 Z_o / k_s \tag{15}$$

Then:

$$k_s / A_p A_d Z_o = \tau (A_p / A_d) \tag{16}$$

This equation can be rewritten as:

$$x_p / x_d = s(A_d / A_p \tau)/(\tau s + 1) \tag{17}$$

Equation (17) therefore represents the ratio of the incremental displacements of the pump and damper pistons needed to create the resepctive flows to accomplish the desired result.

The relationship expressed by equation (17) is graphically illustrated in FIG. 12, which plots log $x_p/x_d$ (ordinate) vs. log w (abscissa). Thus curve s is depicted as being of unit slope and extending upwardly and rightwardly, while curve $(1/\tau s + 1)$ is shown as having a substantially horizontal portion which, at its intersection with curve s, extends downwardly and rightwardly at a negative unit slope. Thus, when curve $(1/\tau s+1)$ is subtracted from curve s, the resulting curve extends upwardly and rightwardly at a unit slope to the intersection of curves $(1/\tau s+1)$ and s, and then extends substantially horizontally and rightwardly therefrom with increasing frequency. The intersection of curves $(1/\tau s+1)$ and s occurs at a frequency of $\omega = 1/\tau$, which is defined as the predetermined "break" frequency in the preferred embodiment. At frequencies of less than $\omega = 1/\tau$, the log $x_p/x_d$ ratio will be attenuated. However, above the "break" frequency, this ratio remains substantially constant. Thus, the pump is effectively coupled to the damper at frequencies above the "break" frequency so as to create an opposing waveform, but effectively decoupled from the damper at frequencies below the "break" frequency. The "break" frequency may be selected and designed to allow such decoupling at engine speed change and torque variation frequencies, but to provide for such coupling (and, hence, force cancellation) over the range of engine vibration frequencies.

FIG. 10 illustrates the situation at which the engine has moved downwardly by a distance $\Delta x$ beyond its preload displacement $x_o$. This incremental displacement is not necessarily the maximum amplitude of the vibrational displacement, and it is further assumed that the engine is moving downwardly toward the support at that particular time. Such downward velocity of the engine toward the support increases the volume of lower damper chamber 31 and decreases the volume of upper damper chamber 30, thereby forcing a flow $(Q_d)$ of fluid from the upper damper chamber through the orifice to the lower damper chamber. Thus, such relative velocity between the masses creates a flow through the orifice, which, in turn, creates a pressure differential of one polarity and magnitude across the orifice at that particular time. As demonstrated above, this damper force (i.e., C cos wt) lags the spring force (i.e., A + B sin wt) by 90°.

However, as the engine is moving downwardly toward the support to create flow $Q_d$, actuator 48 is simultaneously moving pump piston 50 downwardly relative to its cylinder to create an opposing flow $Q_p$ from pump lower chamber 52 through the orifice to pump upper chamber 51. If these two opposing flows, $Q_d$ and $Q_p$, were of like magnitude and in-phase, they would simply cancel one another, and the net flow through the orifice would be zero. Hence, no net force would be transmitted through the damper. However, in this example, the spring is further compressed by an incremental distance $\Delta x$, and therefore transmits an incremental force to the support (i.e., $\Delta F_s = k_s \Delta x$). However, in the preferred embodiment, the fluid displacement generating means is operated so as to exert an opposing force on the two masses which closely simulates the sum of the dynamic forces transmitted through the spring and damper, but which is 180° out-of-phase with respect to the sum of such vibrational forces, so that the pump-produced force opposes and cancels the total dynamic force transmitted through the spring and damper and attirbutable to such vibration. Since no hydromechanical system can respond instantaneously, the history of past vibrations is used to predict and anticipate a dynamic waveform of similar shape in the future. However, if the vibrations are indeed sinusoidal, this remembrance-of-past-waveforms-to-predict-future-needs is valid under steady state conditions. Any varia-tion in the present vibrational waveform can be accomodated by a low-frequency change in the pump-produced opposing waveform until steady state conditions are again achieved.

FIG. 11 depicts the converse situation in which the engine is moving upwardly away from the support, and is at a particular incremental displacement $\Delta x$ above the preload displacement at that particular point in time. In this situation, the damper piston is moving downwardly relative to the cylinder to reduce the volume of damper lower chamber 31 and to increase the volume of upper chamber 30. Hence, such motion causes a flow $(Q_d)$ of fluid from chamber 31 through the orifice toward chamber 30. This flow creates a pressure differential across the orifice which has a polarity opposite to the corresponding damper-produced differential in FIG. 10. However, at this opposite to the corresponding damper-produced differential in FIG. 10. However, at this particular point in time, the pump piston is moved upwardly relative to its cylinder to create a pump-produced flow $(Q_p)$ which is of like magnitude, nut 180° out-of-phase with respect to the sum of the dynamic forces transmitted through the spring and damper, thereby cancelling such dynamic forces.

A commercial form of the improved mount is generally indicated at 65 in FIG. 13. In this embodiment, the spring and damper are physically combined in a single integrally-formed spring-and-damper member 66, which is shown as being a block of suitable resilient material having inwardly-tapered sides, which forms an elastomerically-deformable fluid enclosure. More particularly, member 66 has a central horizontal opening 67 through which a cross-bar 68 is passed. Bar 68 is connected to the engine via left and right vertical members 69,70. Hence, vibration of the engine will be transmitted through members 69,70 to cross-member 68. Upper and lower chambers 71,72 are molded into member 66. Each of these chambers is shown as being bounded by an isosceles trapezoidal wall. The longer base of upper chamber 71 is arranged above its shorter base, while the longer base of lower chamber 72 is arranged beneath its shorter base. Member 66 is vertically confined within an enclosure 73 provided on the support 74. Enclosure 73 is shown as having left and right openings 75,75' to accommodate passage of cross-bar 68, and to allow vertical motion of the bar relative to the enclosure. Chambers 71,72 are analogous to damper chambers 30,31, respectively. The salient difference is that in the embodiment shown in FIG. 13, the spring and damper are provided in the same member. Persons skilled in this art will appreciate that member 66 has an integral spring function because of the resiliency of the material of which it is formed. At the same time, if fluid is displaced from lower chamber 72 to upper chamber 71, the engine may move downwardly, collapsing or deforming the illustrated shape of the lower chamber. Conversely, if fluid is displaced from upper chamber 71 to lower chamber 72, the opposite will occur. Chambers 71,72 communicate with one another via conduit 76 which contains a restricted orifice 77.

In this form, the pump 78 is driven by an electrohydraulic servovalve 79. Pump 78 has a horizontally-elongated body 80 having annular vertical left and right end faces 81,82, respectively. Body 80 has a stepped axial through-bore bounded by (from left-to-right in FIG. 13): an inwardly-facing horizontal cylindrical surface 83 extending rightwardly from left end face 81, a leftwardly-facing annular vertical surfaces 84, an inwardly-facing horizontal cylindrical surface 85, a rightwardly-facing annular vertical surface 86, an inwardly-facing horizontal cylindrical surface 88, a leftwardly-facing annular vertical surface 89, an inwardly-facing horizontal cylindrical surface 90, a rightwardly-faciang annular vertical surface 91, and an inwardly-facing horizontal cylindrical surface 92 continuing rightwardly therefrom to join right end face 82. A piston 93 is operative arranged within the bore defined by middle cylindrical wall 88 for sliding movement therealong toward and away from wall 86,89, respectively. Stems 94,95 extend leftwardly and rightwardly from piston 93, through cylindrical openings 85,90, respectively. Cup-shaped members 96,98 are mounted on the distal ends of stems 94,95, and are joined to the body by bellows 99,100, respectively. The interiors of these bellows are vented to return via check valves, as shown. A left diaphragm 101 has its periphery compressively sandwiched between a left end cap 102 and the body left face 81, and engages the leftwardly-facing circular vertical surface of cap member 96. Similarly, a right diaphragm 103 has its periphery compressively sandwiched between a right end cap 104 and body right end face 82, and engages the rightwardly-facing circular vertical surface of cup-shaped member 98. Thus, a first chamber 105 is defined between diaphragm 101 and left end cap 102, and a second chamber 106 is defined between diaphragm 103 and right end cap 104. Passageway 108 communicates left pump chamber 105 with conduit 76 above orifice 77, and passageway 109 communicates right pump chamber 106 with conduit 76 below orifice 77. Hence, the upper and lower member chambers 71,72 are connected hydraulically in parallel with orifice 77 and pump chambers 105,106. In this form, servovalve 79 controls the flows of fluid with respect to piston chambers 110,111 for selectively displacing piston 93 leftwardly or rightwardly, as desired.

FIG. 14 depicts another form of the invention, in which a short-stroke actuator, again indicated at 48, is positioned so as to mechanically in series with the damper. In this embodiment, the fluid displacement generating means looks somewhat different, but nevertheless operates to produce the desired pressure differential across the orifice. The actuator is operated so as to exert a force waveform on the support and damper piston which closely simulates the dynamic waveform attributable to the vibration, but which is substantially 180° out-of-phase with respect thereto. Here again, the object is to effectively cancel the vibration-produced dynamic force so that the support "feels" only the static weight of the engine and any quasi-static changes in loading below the "break" frequency. In the previously-described embodiments, the fluid displacement generating means had a pump and an actuator. The pump was connected in parallel with the orifice. Hence, the pump could be selectively operated to create the desired pressure differential across the orifice. In this embodiment, however, the actuator is connected mechanically in series with the damper. Hence, when the actuator is either extended or retracted, the effect will be to selectively create a pressure differential across the damper piston. In other words, the embodiment shown in FIG. 14 is the functional-equivalent of the other improved embodiments. Thus, while it might look somewhat differently, this embodiment operates in the same manner as those previously described.

MODIFICATIONS

The present invention contemplates that many changes and modifications may be made.

For example, the damper may be a conventional piston-and-cylinder arrangement having a constant-area orifice, or may have a variable-area orifice. Indeed, the damper need not necessarily be a piston-and-cylinder arrangement. Alternatively, it could have the two chambers separated by a diaphragm. Similarly, the pump need not invariable have a piston slidably mounted within a cylinder. Other forms may be substituted therefor. The orifice may take many different forms (e.g., and orifice plate, a tube, or a restriction of some other form).

The actuator may be a short-stroke variable air gap electromagnetic motor, an electrohydraulic servoactuator, a piezoelectric device, or some other mechanism.

The invention is not limited to use with suspensions between engines and their supports, but may be used in various suspensions between vibrating machines or masses and their supports.

Therefore, while several forms of the improved suspension has been shown and described, and various modifications thereof discussed, persons skilled in this art will readily appreciate that various additional changes and modifications may be made without departing from the spirit of the invention, as defined and differentiated by the following claims.

I claim:

1. In a suspension having one mass arranged to move relatively toward and away from another mass, and having a spring an damper arranged in parallel with one another to act between said masses, said damper having first and second opposed chambers communicating with one another through a restricted orifice, the improvement which comprises:

fluid displacement generating means operatively arranged to selectively create a desired net pressure differentail across said orifice, said fluid generating means including a fluid pump having opposide first and second chambers, said pump first chamber communicating with said damper first chamber and said pump second chamber communicating with said damper second chamber, each of said chambers being filled with fluid, and an actuator operatively arranged to controllable vary the volumes of said pump chambers to create said net pressure differential across said orifice.

2. The improvement as set forth in claim 1 wherein said fluid displacement generating means is aranged to reduce the dynamic force attributable to such relative motion transmitted through at least one of said spring and damper.

3. The improvement as set forth in claim 1 wherein said fluid displacement generating means is arranged to create such pressure differential to oppose and substantially cancel the dynamic force attributable to such relative motion transmitted through said spring and chamber.

4. The improvement as set forth in claim 1 wherein said fluid displacement generating means includes an actuator arranged mechanically in series with said damper.

5. The improvement as set forth in claim 1 wherein said spring and damper are provided in an elastically-deformable fluid enclosure.

6. The improvement as set forth in claim 1 wherein said actuator is hydraulically driven.

7. The improvement as set forth in claim 1 wherein said fluid displacement generating means is arranged to create said net pressure differential only above a predetermined frequency.

8. The improvement as set forth in claim 1 wherein said fluid displacement generating means is arranged to create said net pressure differential to oppose and substantially cancel the dynamic force transmitted through said suspension above said predetermined frequency.

9. The improvement as set forth in claim 7 wherein said fluid displacement generating means does not create an incremental pressure differential across said orifice below said predetermined frequency.

10. The improvement as set forth in claim 1 wherein said fluid displacement generating means is arranged to create a pressure differential across said orifice which is summed with the pressure differential across said orifice attributable to said relative movement between said members to create said net pressure differential.

11. The improvement as set forth in claim 1 wherein said pump is a piston-and-cylinder arrangement.

12. The improvement as set forth in claim 1 wherein said actuator is a short-stroke variable air gap electromagnetic motor.

13. The improvement as set forth in claim 1 wherein said pump is operated to exert a force on said masses similar to, but substantually 180° out-of-phase with respect to, the waveform of the total dynamic force attributable to such relative movement between said masses.

14. The improvement as set forth in claim 7 wherein said predetermined frequency is established by appropriate selection of the pump piston area, the orifice size, and the spring stiffness.

15. The method of operating a suspension having one mass arranged to move relatively toward and away from another mass, and having a spring and damper arranged in parallel with one another to act between said masses, said damper having first and second opposed chambers communication with one another through a restricted orifice and having a fluid pump having opposed first and second chambers, said first pump chamber communicating with said damper first chamber and said pump second chamber communicating with said damper second chamber, each of said chambers being filled with fluid, and having an actuator operatively arranged to controllable vary the volumes of said pump chamber to create said net pressure differential across said orifice, which method comprises the steps of:

operating said actuator to cause said pump to selectively create a desired pressure differential across said orifice.

16. The method of controlling the transmission of forces through a suspension having a spring and damper arranged in parallel with one another to act between two masses which are mounted for relative movement toward and away from one another, said damper having a restricted orifice communicating opposing chambers, said suspension also having a motor-drivien pump provided with opposed first and second chambers, said pump first chamber communicating with said damper first chamber and said pump second chamber communicating with said damper second chamber, each of said chambers being filled with fluid, comprising the steps of:

operating said pump to create a desired incremental pressure differential across said orifice above a predetermined frequency; and effectively decoupling said pump from said damper below said predetermined frequency;

thereby to allow excursion of the damper below said frequency substantially unimpeded by the operation of said pump.

* * * * *